US011424976B1

United States Patent
Adamo et al.

(10) Patent No.: US 11,424,976 B1
(45) Date of Patent: Aug. 23, 2022

(54) METHODS AND SYSTEMS FOR ANOMALY DETECTION

(71) Applicant: JPMorgan Chase Bank, N.A., New York, NY (US)

(72) Inventors: Cristian Adamo, Buenos Aires (AR); Victor D. Casas Hernandez, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/202,921

(22) Filed: Mar. 16, 2021

(51) Int. Cl.
*H04L 29/08* (2006.01)
*H04L 41/0654* (2022.01)
*H04L 41/22* (2022.01)
*H04L 41/04* (2022.01)
*H04L 41/0816* (2022.01)
*H04L 41/16* (2022.01)

(52) U.S. Cl.
CPC .......... *H04L 41/0654* (2013.01); *H04L 41/04* (2013.01); *H04L 41/0816* (2013.01); *H04L 41/16* (2013.01); *H04L 41/22* (2013.01)

(58) Field of Classification Search
CPC . H04L 41/0654; H04L 41/04; H04L 41/0816; H04L 41/16; H04L 41/22
See application file for complete search history.

(56) References Cited

U.S. PATENT DOCUMENTS

| 2016/0234087 | A1* | 8/2016 | Nyerges | H04Q 9/00 |
| 2017/0235622 | A1* | 8/2017 | Boyapalle | G06F 11/3409 714/47.2 |
| 2020/0195517 | A1* | 6/2020 | Manthena | G06N 7/00 |
| 2021/0200566 | A1* | 7/2021 | Petkov | G06F 11/3409 |

* cited by examiner

*Primary Examiner* — Adnan M Mirza

(74) *Attorney, Agent, or Firm* — Greenblum & Bernstein, P.L.C.

(57) ABSTRACT

A method and a system for detecting anomalies that indicate potential system infrastructure problems is provided. The method includes: obtaining a first set of telemetry data that relates to a system infrastructure events, logs, and metrics that occur during a predetermined time interval; retrieving, from a memory, historical data that relates to system infrastructure telemetry; comparing the obtained first set of telemetry data with the retrieved historical data; detecting an anomaly based on a result of the comparing; and determining a potential system infrastructure problem based on the detected anomaly. The method may include using a machine learning algorithm to analyze the obtained first set of telemetry data; identify a pattern in the data; assign scores to the events included in the data; and use the pattern and/or the scores to detect the anomaly using an artificial intelligence (AI) model that is trained using the retrieved historical data.

14 Claims, 4 Drawing Sheets

METHODS AND SYSTEMS FOR ANOMALY DETECTION

BACKGROUND

1. Field of the Disclosure

This technology generally relates to methods and systems for detecting anomalies, and more particularly, to methods and systems for using machine learning techniques to detect anomalies that act as indicators of future system infrastructure malfunctions.

2. Background Information

Many organizations rely on computer systems and networks to perform routine tasks. For large organizations that have thousands of users, such systems and networks may be interconnected in a large infrastructure that hosts large numbers of hardware components and many software modules that facilitate communications and interactions among the users.

When a problem occurs within the system infrastructure, the problem may be relatively small and easy to remedy, or the problem may cause delays and/or outages that are disruptive, time-consuming, and/or expensive. As a result, organizations typically use various approaches to addressing such problems when they occur and to attempting to avoid and/or prevent such problems before they occur.

Avoiding and/or preventing system infrastructure problems before they occur may be difficult, because the fact that the problem has not yet occurred means that the potential existence of the problem is not readily apparent. Accordingly, there is a need for a method for detecting anomalies that indicate a potentiality of such a problem.

SUMMARY

The present disclosure, through one or more of its various aspects, embodiments, and/or specific features or sub-components, provides, inter alia, various systems, servers, devices, methods, media, programs, and platforms for using machine learning techniques to detect anomalies that act as indicators of future system infrastructure malfunctions.

According to an aspect of the present disclosure, a method for detecting an anomaly that acts as an indicator of a potential system infrastructure malfunction is provided. The method is implemented by at least one processor. The method includes: obtaining, by the at least one processor, a first set of telemetry data that relates to a plurality of system infrastructure telemetry that occur during a predetermined time interval; retrieving, by the at least one processor from a memory, historical data that relates to system infrastructure telemetry; comparing, by the at least one processor, the obtained first set of telemetry data with the retrieved historical data; detecting, by the at least one processor, at least one anomaly based on a result of the comparing; and determining, by the at least one processor, at least one potential system infrastructure problem based on the detected at least one anomaly. The telemetry includes at least one from among at least one event, at least one log, and at least one metric.

The method may further include applying at least one machine learning algorithm to the obtained first set of telemetry data.

The method may further include using the at least one machine learning algorithm to: analyze the obtained first set of telemetry data; identify at least one pattern based on a result of the analyzing; and compare the identified at least one pattern with the retrieved historical data to detect the at least one anomaly by using an artificial intelligence (AI) model that is trained using the retrieved historical data.

The method may further include: obtaining a catalog that includes a plurality of infrastructure fixes; selecting at least one infrastructure fix from among the plurality of infrastructure fixes based on the determined at least one potential system infrastructure problem; and applying the selected at least one infrastructure fix.

The method may further include using the at least one machine learning algorithm to assign a respective score to each of the obtained first set of telemetry data, and using each assigned respective score to detect the at least one anomaly.

The method may further include displaying, by the at least one processor on a user interface, a message that relates to the determined at least one potential system infrastructure problem.

The message may include first information that describes the determined at least one potential system infrastructure problem, second information that describes an expected result from a failure to avoid the potential system infrastructure problem, and third information that describes a time at which the potential system infrastructure problem is expected to occur.

The method may further include transmitting, by the at least one processor to a predetermined destination, an email message that relates to the determined at least one potential system infrastructure problem.

The message may include first information that describes the determined at least one potential system infrastructure problem, second information that describes an expected result from a failure to avoid the potential system infrastructure problem, and third information that describes a time at which the potential system infrastructure problem is expected to occur.

The predetermined time interval may be equal to four hours.

The predetermined time interval may be equal to twenty-four hours.

According to another exemplary embodiment, a computing apparatus for detecting an anomaly that indicates a potential system infrastructure problem is provided. The computing apparatus includes a processor; a memory; and a communication interface coupled to each of the processor and the memory. The processor is configured to: obtain a first set of telemetry data that relates to a plurality of system infrastructure telemetry that occur during a predetermined time interval; retrieve, from the memory, historical data that relates to system infrastructure telemetry; compare the obtained first set of telemetry data with the retrieved historical data; detect at least one anomaly based on a result of the comparing; and determine at least one potential system infrastructure problem based on the detected at least one anomaly. The telemetry includes at least one from among at least one event, at least one log, and at least one metric.

The processor may be further configured to apply at least one machine learning algorithm to the obtained first set of telemetry data.

The processor may be further configured to use the at least one machine learning algorithm to: analyze the obtained first set of telemetry data; identify at least one pattern based on a result of the analyzing; and compare the identified at least one pattern with the retrieved historical data to detect the at least one anomaly by using an artificial intelligence (AI) model that is trained using the retrieved historical data.

The computing apparatus of claim 13, wherein the processor is further configured to: obtain a catalog that includes a plurality of infrastructure fixes; select at least one infrastructure fix from among the plurality of infrastructure fixes based on the determined at least one potential system infrastructure problem; and apply the selected at least one infrastructure fix.

The processor may be further configured to use the at least one machine learning algorithm to assign a respective score to each of the obtained first set of telemetry data, and to use each assigned respective score to detect the at least one anomaly.

The computing apparatus may further include a display. The processor may be further configured to cause the display to display a user interface that includes a message that relates to the determined at least one potential system infrastructure problem.

The message may include first information that describes the determined at least one potential system infrastructure problem, second information that describes an expected result from a failure to avoid the potential system infrastructure problem, and third information that describes a time at which the potential system infrastructure problem is expected to occur.

The processor may be further configured to transmit, via the communication interface to a predetermined destination, an email message that relates to the determined at least one potential system infrastructure problem.

The message may include first information that describes the determined at least one potential system infrastructure problem, second information that describes an expected result from a failure to avoid the potential system infrastructure problem, and third information that describes a time at which the potential system infrastructure problem is expected to occur.

The predetermined time interval may be equal to four hours.

The predetermined time interval may be equal to twenty-four hours.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
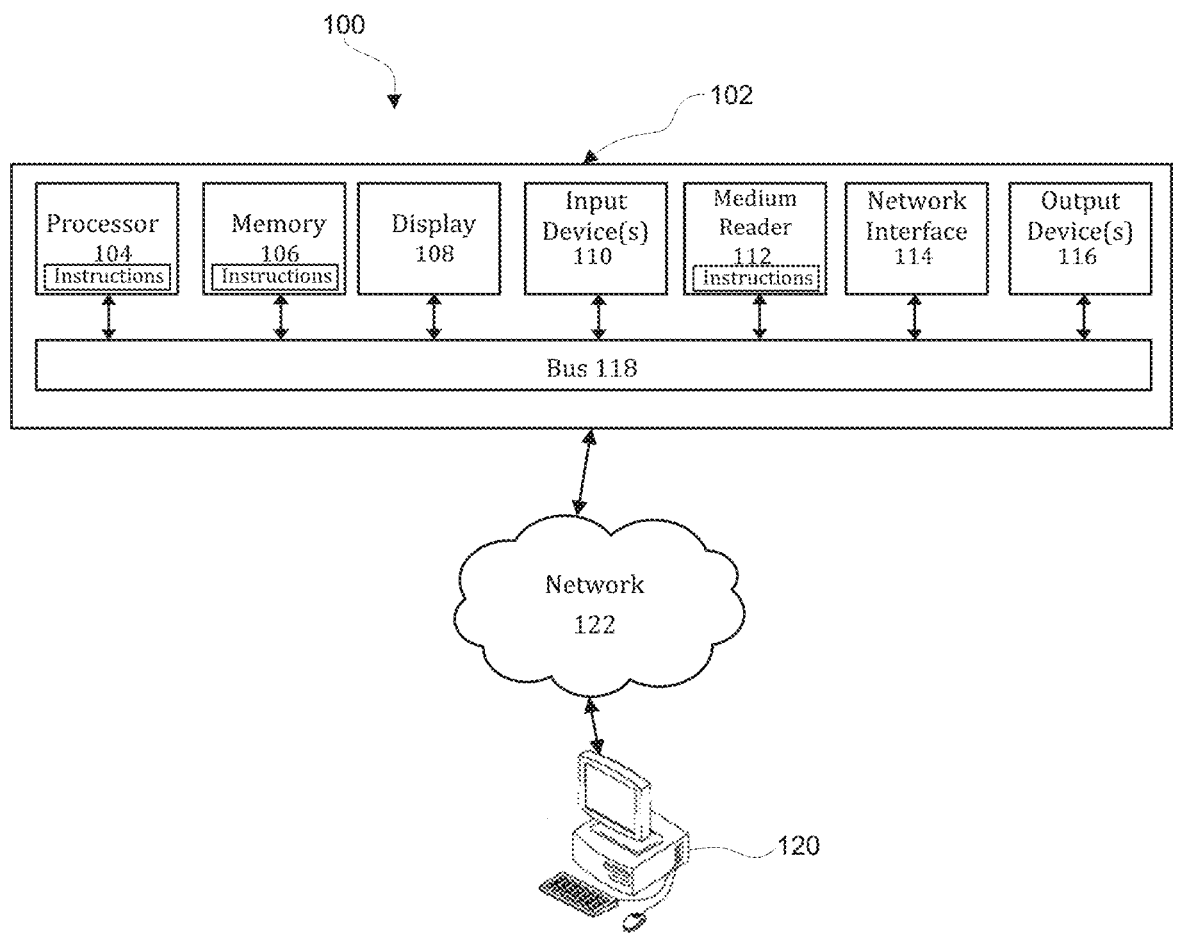
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using machine learning techniques to detect anomalies that act as indicators of future system infrastructure malfunctions.

Figure 2:
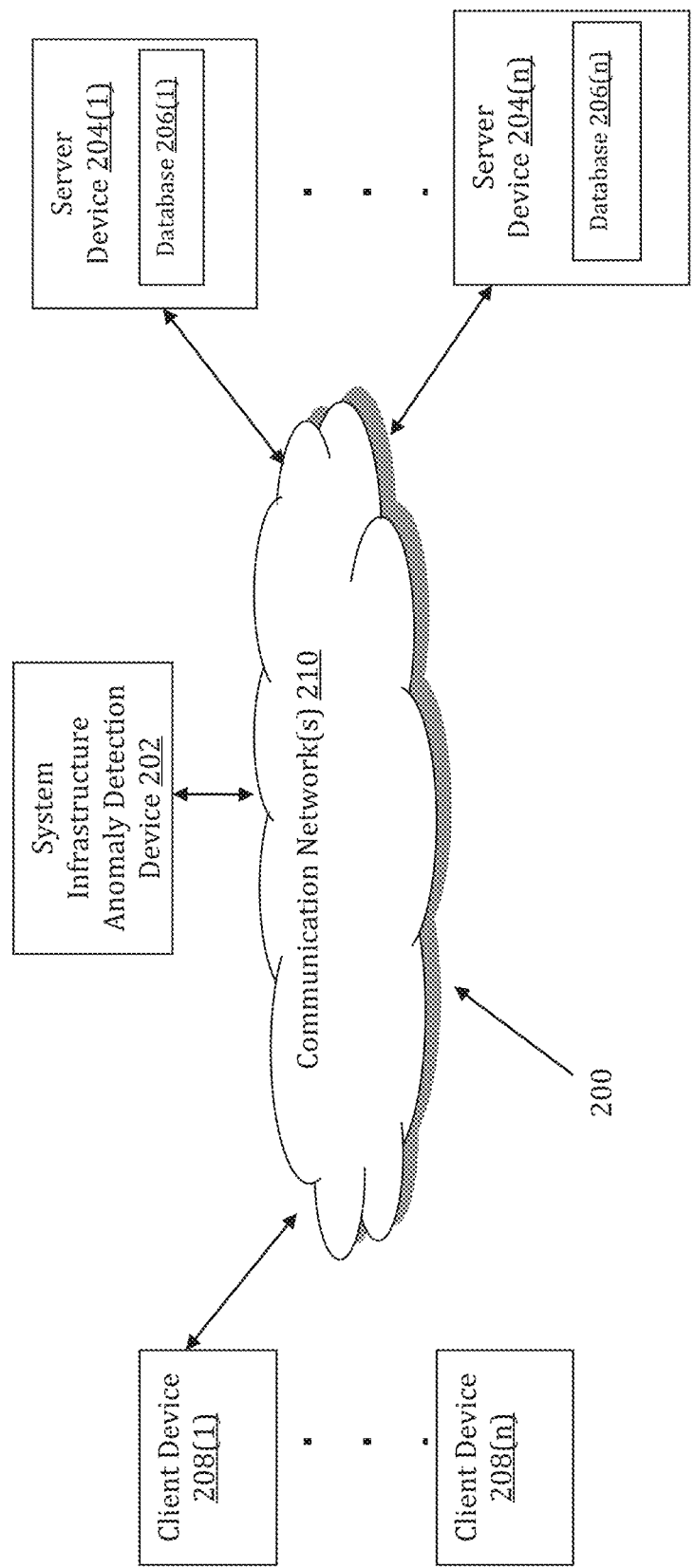
FIG. 2 illustrates an exemplary diagram of a network environment.

Referring to FIG. 2, a schematic of an exemplary network environment 200 for implementing a method for using machine learning techniques to detect anomalies that act as indicators of future system infrastructure malfunctions is illustrated. In an exemplary embodiment, the method is executable on any networked computer platform, such as, for example, a personal computer (PC).

The method for using machine learning techniques to detect anomalies that act as indicators of future system infrastructure malfunctions in a manner that is implementable in various computing platform environments may be implemented by a System Infrastructure Anomaly Detection (SIAD) device 202. The SIAD device 202 may be the same or similar to the computer system 102 as described with respect to FIG. 1. The SIAD device 202 may store one or more applications that can include executable instructions that, when executed by the SIAD device 202, cause the SIAD device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SIAD device 202 itself, may be located in virtual server(s) running in a cloud-based computing environment rather than being tied to one or more specific physical network computing devices. Also, the application(s) may be running in one or more virtual machines (VMs) executing on the SIAD device 202. Additionally, in one or more embodiments of this technology, virtual machine(s) running on the SIAD device 202 may be managed or supervised by a hypervisor.

In the network environment 200 of FIG. 2, the SIAD device 202 is coupled to a plurality of server devices 204(1)-204(n) that hosts a plurality of databases 206(1)-206(n), and also to a plurality of client devices 208(1)-208(n) via communication network(s) 210. A communication interface of the SIAD device 202, such as the network interface 114 of the computer system 102 of FIG. 1, operatively couples and communicates between the SIAD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SIAD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and NIAD devices that efficiently implement a method for using machine learning techniques to detect anomalies that act as indicators of future system infrastructure malfunctions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SIAD device 202 may be a standalone device or integrated with one or more other devices or apparatuses, such as one or more of the server devices 204(1)-204(n), for example. In one particular example, the SIAD device 202 may include or be hosted by one of the server devices 204(1)-204(n), and other arrangements are also possible. Moreover, one or more of the devices of the SIAD device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SIAD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical system telemetry data and machine learning algorithm application-specific data that is usable for detecting anomalies that act as indicators of future system infrastructure malfunctions.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SIAD device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SIAD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SIAD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SIAD device 202, the server devices 204(1)-204(n), or the client devices 208(1)-208(n), for example, may be configured to operate as virtual instances on the same physical machine. In other words, one or more of the SIAD device 202, the server devices 204(1)-204(n), or the client devices 208(1)-208(n) may operate on the same physical device rather than as separate devices communicating through communication network(s) 210. Additionally, there may be more or fewer SIAD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
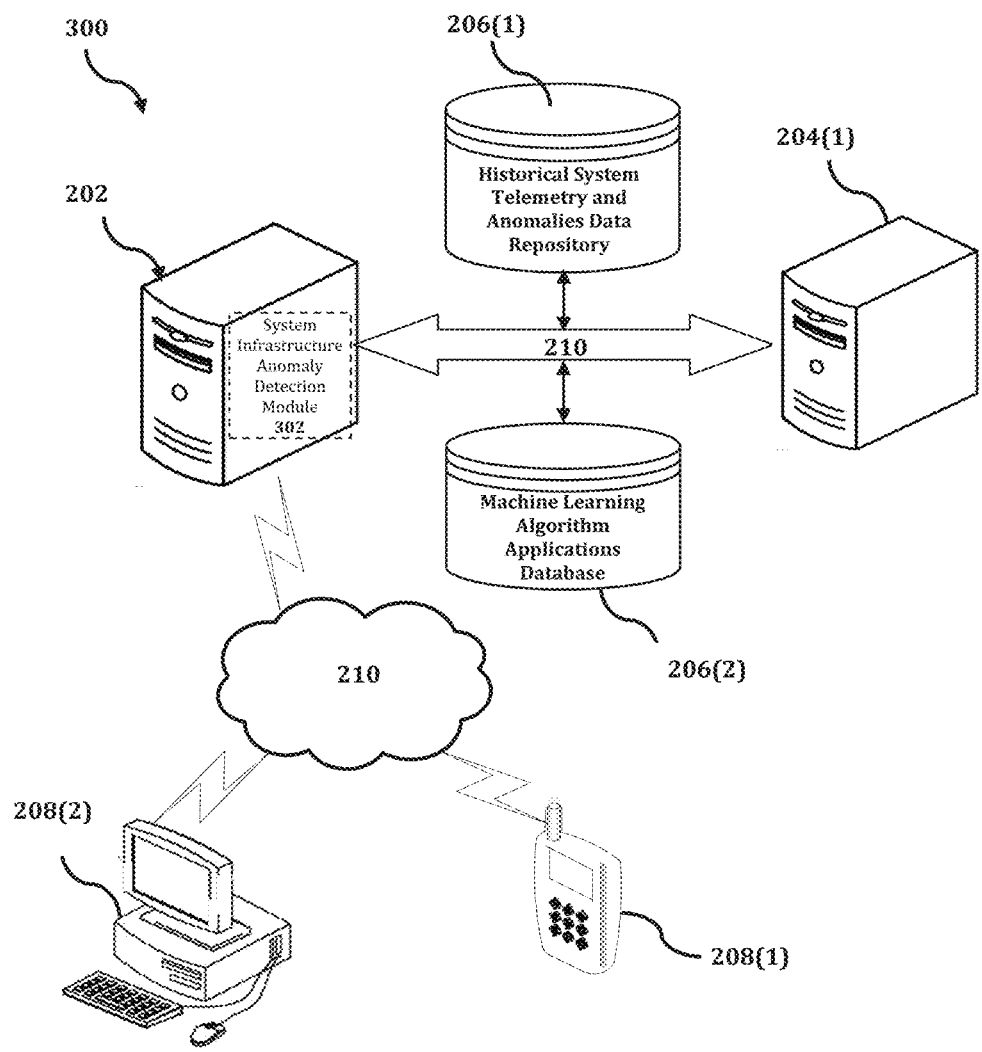
FIG. 3 shows an exemplary system for implementing a method for using machine learning techniques to detect anomalies that act as indicators of future system infrastructure malfunctions.

The SIAD device 202 is described and shown in FIG. 3 as including a system infrastructure anomaly detection module 302, although it may include other rules, policies, modules, databases, or applications, for example. As will be described below, the system infrastructure anomaly detection module 302 is configured to implement a method for using machine learning techniques to detect anomalies that act as indicators of future system infrastructure malfunctions in an automated, efficient, scalable, and reliable manner.

An exemplary process 300 for implementing a method for using machine learning techniques to detect anomalies that act as indicators of future system infrastructure malfunctions by utilizing the network environment of FIG. 2 is shown as being executed in FIG. 3. Specifically, a first client device 208(1) and a second client device 208(2) are illustrated as being in communication with SIAD device 202. In this regard, the first client device 208(1) and the second client device 208(2) may be "clients" of the SIAD device 202 and are described herein as such. Nevertheless, it is to be known and understood that the first client device 208(1) and/or the second client device 208(2) need not necessarily be "clients" of the SIAD device 202, or any entity described in association therewith herein. Any additional or alternative relationship may exist between either or both of the first client device 208(1) and the second client device 208(2) and the SIAD device 202, or no relationship may exist.

Further, SIAD device 202 is illustrated as being able to access a historical system telemetry and anomalies data repository 206(1) and a machine learning algorithm applications database 206(2). The system infrastructure anomaly detection module 302 may be configured to access these databases for implementing a method for using machine learning techniques to detect anomalies that act as indicators of future system infrastructure malfunctions.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SIAD device 202 via broadband or cellular communication. Of course, these embodiments are merely exemplary and are not limiting or exhaustive.

Upon being started, the system infrastructure anomaly detection module 302 executes a process for using machine learning techniques to detect anomalies that act as indicators of future system infrastructure malfunctions. An exemplary process for detecting anomalies that act as indicators of future system infrastructure malfunctions is generally indicated at flowchart 400 in FIG. 4.

Figure 4:
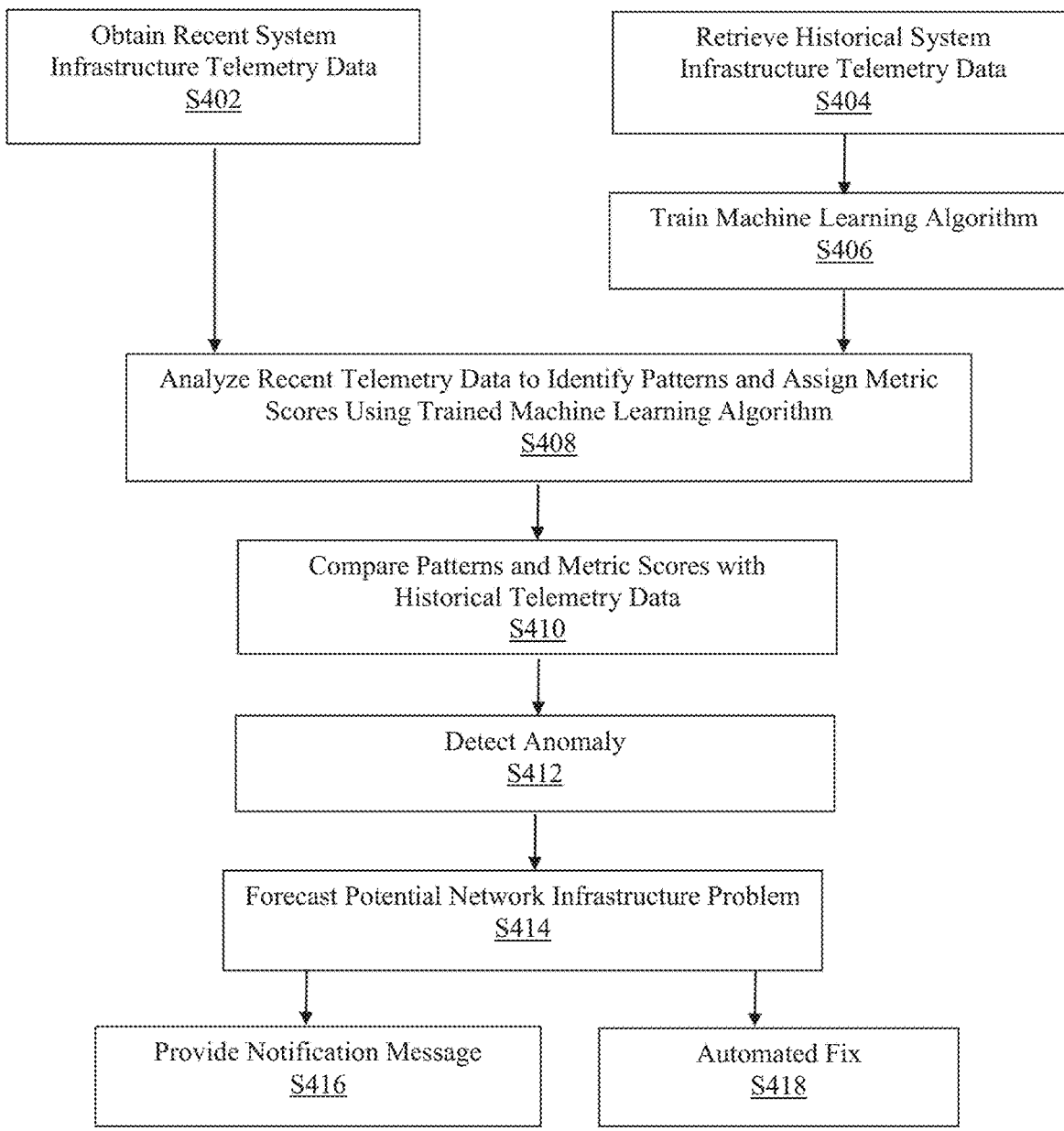
FIG. 4 is a flowchart of an exemplary process for implementing a method for using machine learning techniques to detect anomalies that act as indicators of future system infrastructure malfunctions.

In the process 400 of FIG. 4, at step S402, the system infrastructure anomaly detection module 302 obtains recent system infrastructure telemetry data that has occurred during a predefined time interval. The telemetry data includes data that relates to events, logs, and/or metrics. In an exemplary embodiment, the recent telemetry data may be obtained over a four-hour interval, a 24-hour interval, or any other suitable interval. Further, the recent telemetry data may be updated periodically, such as, for example, every 30 minutes, every hour, or every two hours, so that the obtaining of recent system infrastructure data is performed on a "rolling" basis.

At step S404, the system infrastructure anomaly detection module 302 retrieves historical system infrastructure telemetry data from a memory, such as, for example, historical system telemetry and anomalies data repository 206(1). Then, at step S406, the system infrastructure anomaly detection module 302 uses the retrieved historical telemetry data to train a machine learning algorithm, such as, for example, an algorithm that is stored in machine learning algorithm applications database 206(2).

At step S408, the system infrastructure anomaly detection module 302 analyzes the obtained recent telemetry data in order to identify patterns in the data. In an exemplary embodiment, the machine learning algorithm may be used to assign one or more scores to the obtained recent telemetry data. For example, the machine learning algorithm may include metrics that are defined within the algorithm, and the algorithm may then compute numerical values that act as scores for each such metric with respect to the obtained recent telemetry data.

At step S410, the system infrastructure anomaly detection module 302 compares the results of the analysis performed in step S408 with the retrieved historical data. Then, at step S412, the system infrastructure anomaly detection module 302 detects an anomaly in the recent telemetry data. In an exemplary embodiment, the machine learning algorithm may be used to compare the identified patterns and/or computed metric scores of the recent telemetry data with similar patterns and metric scores from the retrieved historical telemetry data, and when those patterns and/or metric scores in the historical data are correlated with subsequent system infrastructure problems, an anomaly may be detected.

At step S414, the system infrastructure anomaly detection module 302 forecasts a potential system infrastructure problem based on the detected anomaly. In an exemplary embodiment, when the machine learning algorithm determines that the detected anomaly is associated with a particular type of system infrastructure problem, the particular problem may be diagnosed as a likely occurrence unless the anomaly is addressed.

At step S416, the system infrastructure anomaly detection module 302 provides a notification message that relates to the potential system infrastructure problem. In an exemplary embodiment, the notification message includes a description of the problem, an expected result of the problem if not addressed or avoided before the problem occurs, and/or a time frame at which the problem is expected to occur. The notification message may be displayed on a user interface of a user, such as, for example, a network administrator or other person that monitors the network and addresses problems and/or potential problems. Alternatively, the notification message may be provided in an email message that is transmitted to users that may be affected by the potential network infrastructure problem. Other alternatives for the notification message include incident systems, application programming interfaces (APIs), and streaming systems.

At step S418, the system infrastructure anomaly detection module 302 may implement an automated fix of the forecasted problem. In an exemplary embodiment, depending on the type of problem that has been diagnosed, the problem may be remedied and/or prevented by automatic application of a means for solving the problem.

Accordingly, with this technology, an optimized process using machine learning techniques to detect anomalies that act as indicators of future system infrastructure malfunctions is provided.

A method and a system for detecting, forecasting and fixing potential anomaly infrastructure problems using AI/ML methodologies is provided. The method includes: obtaining a first set of telemetry data that relates to a system infrastructure events, logs, and metrics that occur during a predetermined time interval; retrieving, from a memory, historical data that relates to system infrastructure telemetry to train an AI model, use the train AI model in conjunction with the obtained first set of telemetry data to produce an anomaly score; detecting an anomaly based on the result of the score; and determining a potential system infrastructure problem based on the detected anomaly.

An additional method includes obtaining a first set of telemetry data that relates to a system infrastructure events, logs, and metrics that occur during a predetermined time interval; retrieving, from a memory, historical data that relates to system infrastructure telemetry to train an AI model; using the trained AI model in conjunction with the obtained first set of telemetry data to produce forecasted pattern for potential anomalous events in the future; detecting a future anomaly based on the result of the forecast; and determining a future potential system infrastructure problem based on the forecasted pattern.

A third method that retrieves the output of the detect or forecast method; obtains a first set of infrastructure fixes catalog; and applies a recommended fix given the potential anomalous behavior detected to correct any potential future negative behavior from happening in the system infrastructure is also provided.

The method may include using a machine learning algorithm to analyze the obtained first set of telemetry data: identify a pattern in the data; assign scores to the events included in the data; and use the pattern and/or the scores to detect the anomaly using an artificial intelligence (AI) model that is trained using the retrieved historical data.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for detecting an anomaly that indicates a potential system infrastructure problem, the method being implemented by at least one processor, the method comprising:
    obtaining, by the at least one processor, a first set of telemetry data that relates to a plurality of system infrastructure telemetry that occur during a predetermined time interval;
    retrieving, by the at least one processor from a memory, historical data that relates to system infrastructure telemetry;
    applying at least one machine learning algorithm to the obtained first set of telemetry data;
    comparing, by the at least one processor, the obtained first set of telemetry data with the retrieved historical data;
    detecting, by the at least one processor, at least one anomaly based on a result of the comparing;
    determining, by the at least one processor, at least one potential system infrastructure problem based on the detected at least one anomaly; and
    displaying, by the at least one processor on a user interface, a message that relates to the determined at least one potential system infrastructure problem,
    wherein the telemetry includes at least one from among at least one event and at least one log, and
    wherein the displayed message includes first information that describes the determined at least one potential system infrastructure problem, second information that describes an expected result from a failure to avoid the potential system infrastructure problem, and third information that describes a time at which the potential system infrastructure problem is expected to occur.

2. The method of claim 1, further comprising using the at least one machine learning algorithm to:
    analyze the obtained first set of telemetry data;
    identify at least one pattern based on a result of the analyzing; and
    compare the identified at least one pattern with the retrieved historical data to detect the at least one anomaly by using an artificial intelligence (AI) model that is trained using the retrieved historical data.

3. The method of claim 2, further comprising:
obtaining a catalog that includes a plurality of infrastructure fixes;
selecting at least one infrastructure fix from among the plurality of infrastructure fixes based on the determined at least one potential system infrastructure problem; and
applying the selected at least one infrastructure fix.

4. The method of claim 1, further comprising using the at least one machine learning algorithm to assign a respective score to each of the obtained first set of telemetry data, and using each assigned respective score to detect the at least one anomaly.

5. The method of claim 1, further comprising transmitting, by the at least one processor to a predetermined destination, an email message that relates to the determined at least one potential system infrastructure problem.

6. The method of claim 5, wherein the email message includes the first information that describes the determined at least one potential system infrastructure problem, the second information that describes an expected result from a failure to avoid the potential system infrastructure problem, and the third information that describes a time at which the potential system infrastructure problem is expected to occur.

7. The method of claim 1, wherein the predetermined time interval is equal to four hours.

8. A computing apparatus for detecting an anomaly that indicates a potential system infrastructure problem, the computing apparatus comprising:
a processor;
a memory;
a display; and
a communication interface coupled to each of the processor, the display, and the memory,
wherein the processor is configured to:
obtain a first set of telemetry data that relates to a plurality of network infrastructure telemetry that occur during a predetermined time interval;
retrieve, from the memory, historical data that relates to system infrastructure telemetry;
apply at least one machine learning algorithm to the obtained first set of telemetry data;
compare the obtained first set of telemetry data with the retrieved historical data;
detect at least one anomaly based on a result of the comparing;
determine at least one potential system infrastructure problem based on the detected at least one anomaly; and
cause the display to display a user interface that includes a message that relates to the determined at least one potential system infrastructure problem,
wherein the telemetry includes at least one from among at least one event and at least one log, and
the displayed message includes first information that describes the determined at least one potential system infrastructure problem, second information that describes an expected result from a failure to avoid the potential system infrastructure problem, and third information that describes a time at which the potential system infrastructure problem is expected to occur.

9. The computing apparatus of claim 8, wherein the processor is further configured to use the at least one machine learning algorithm to:
analyze the obtained first set of telemetry data;
identify at least one pattern based on a result of the analyzing; and
compare the identified at least one pattern with the retrieved historical data to detect the at least one anomaly by using an artificial intelligence (AI) model that is trained using the retrieved historical data.

10. The computing apparatus of claim 9, wherein the processor is further configured to:
obtain a catalog that includes a plurality of infrastructure fixes;
select at least one infrastructure fix from among the plurality of infrastructure fixes based on the determined at least one potential system infrastructure problem; and
apply the selected at least one infrastructure fix.

11. The computing apparatus of claim 8, wherein the processor is further configured to use the at least one machine learning algorithm to assign a respective score to each of the obtained first set of telemetry data, and to use each assigned respective score to detect the at least one anomaly.

12. The computing apparatus of claim 8, wherein the processor is further configured to transmit, via the communication interface to a predetermined destination, an email message that relates to the determined at least one potential system infrastructure problem.

13. The computing apparatus of claim 12, wherein the email message includes the first information that describes the determined at least one potential system infrastructure problem, the second information that describes an expected result from a failure to avoid the potential system infrastructure problem, and the third information that describes a time at which the potential system infrastructure problem is expected to occur.

14. The computing apparatus of claim 8, wherein the predetermined time interval is equal to four hours.

* * * * *